US008433158B2

(12) United States Patent
Menon

(10) Patent No.: US 8,433,158 B2
(45) Date of Patent: Apr. 30, 2013

(54) OPTICAL SUPERRESOLUTION USING MULTIPLE IMAGES

(75) Inventor: Rajesh Menon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 821 days.

(21) Appl. No.: 12/253,461

(22) Filed: Oct. 17, 2008

(65) Prior Publication Data

US 2010/0097702 A1    Apr. 22, 2010

(51) Int. Cl.
*G06K 9/32*    (2006.01)
*G06K 9/40*    (2006.01)
*H04N 5/217*    (2011.01)

(52) U.S. Cl.
USPC ............................. 382/299; 382/275; 348/241

(58) Field of Classification Search ................... 382/299
See application file for complete search history.

(56) References Cited

U.S. PATENT DOCUMENTS

| 3,987,243 | A | * | 10/1976 | Schwartz | 348/625 |
| 4,517,599 | A | * | 5/1985 | Zwirn et al. | 348/625 |
| 5,682,263 | A | * | 10/1997 | Robb et al. | 359/355 |
| 5,737,456 | A | * | 4/1998 | Carrington et al. | 382/299 |
| 7,260,270 | B2 | * | 8/2007 | Kusaka | 382/275 |
| 7,283,677 | B2 | * | 10/2007 | Gao et al. | 382/250 |
| 2005/0190987 | A1 | * | 9/2005 | Schulz | 382/291 |
| 2006/0175528 | A1 | * | 8/2006 | Greenaway et al. | 250/201.9 |
| 2007/0023686 | A1 | * | 2/2007 | Wolleschensky et al. | 250/458.1 |
| 2007/0242142 | A1 | * | 10/2007 | Okazaki | 348/239 |
| 2008/0252882 | A1 | * | 10/2008 | Kesterson | 356/300 |

FOREIGN PATENT DOCUMENTS

WO         8402989         8/1984

OTHER PUBLICATIONS

Small, Alex et al. "Enhancing diffraction limited images using properties of the point spread function." Optics Express, Apr. 17, 2006, vol. 14, pp. 3193-3203.
Marois, Christian et al. "Differential Imaging with a Multicolor Detector Assembly: A New Exoplanet Finder Concept." The Astrophysics Journal, Nov. 1, 2004, vol. 615, pp. L61-L64.
Notification of Transmittal of the International Search Report and the Written Opinion of the International Searching Authority mailed Apr. 30, 2010 in connection with PCT/US2009/061142.

* cited by examiner

*Primary Examiner* — David Zarka
(74) *Attorney, Agent, or Firm* — Gesmer Updegrove LLP

(57) ABSTRACT

An imaging system is provided. The imaging system includes a point spread function (PSF) module producing a diffraction-limited image of a sample. A convolution module performs convolution of the diffraction-limited image with a first image of a focal spot having a first wavelength to produce a first simulated image. The convolution also performs convolution of the diffraction-limited image with a second image of a focal ring having a second wavelength to produce a second simulated image. A difference module subtracts said first simulated image and said second simulated image to produce said high resolution composite image.

18 Claims, 7 Drawing Sheets

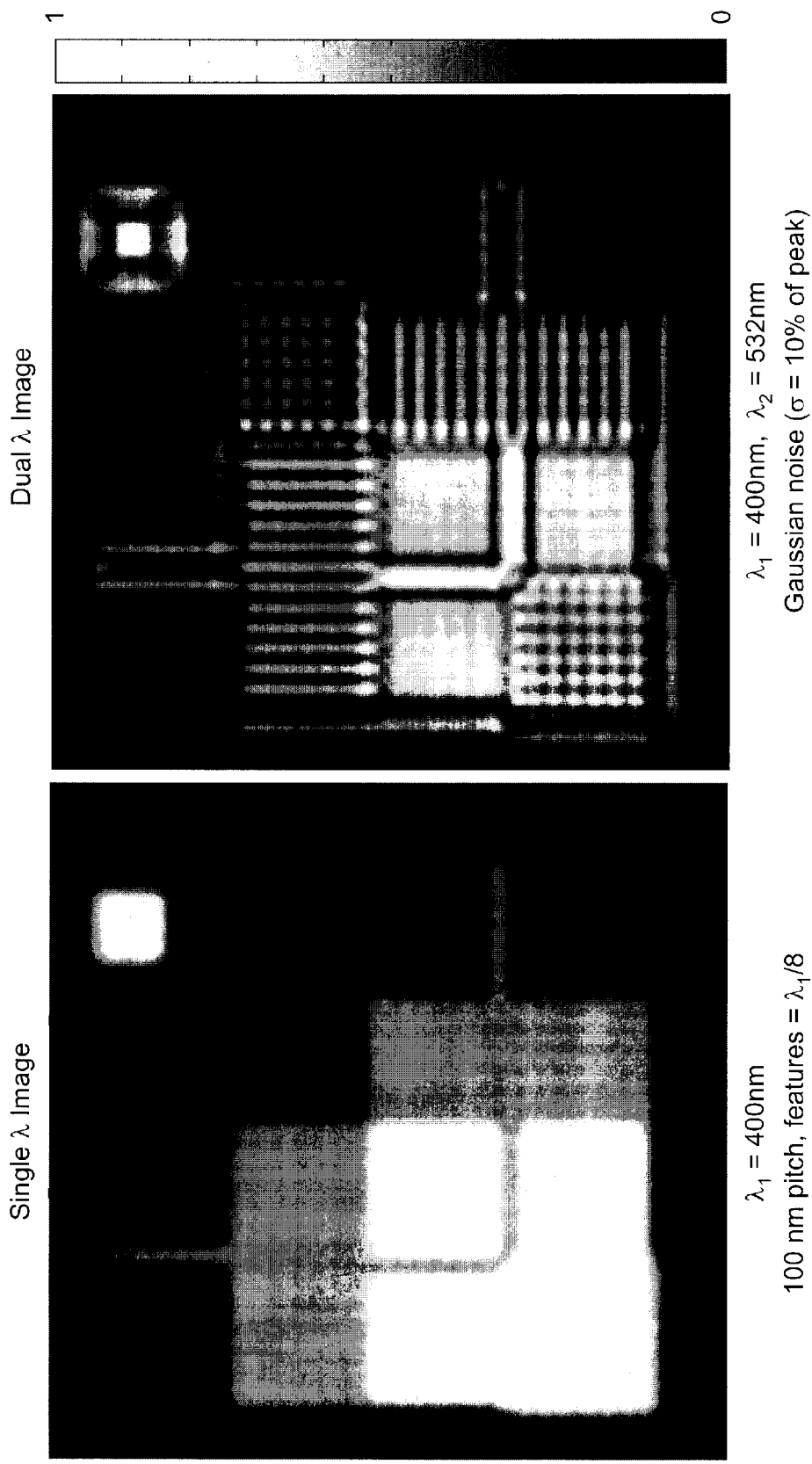

OPTICAL SUPERRESOLUTION USING MULTIPLE IMAGES

BACKGROUND OF THE INVENTION

The invention is related to the field of composite imaging, and in particular the invention uses a technique called Nodal-Differential Imaging (NDI), where an image obtained with a bright focal spot is subtracted from that obtained with a focal ring.

The resolution of optical imaging systems is limited by diffraction to about half the wavelength of illumination. Hence, the resolution of a visible optical microscope is limited to about 250 nm. A large variety of biologically interesting phenomena occur much below this length scale. It is also of great technological importance to be able to image nanostructures (100 nm and below) for the semiconductor industry and the emerging nanotechnology applications. Although electron microscopy can access these regimes, they have fundamental disadvantages. Electrons cause extensive damage to living cells. Electron microscopes require vacuum for the best resolution, which is incompatible with life. Furthermore, electrons being charged particles are easily affected by stray electromagnetic fields. This leads to high uncertainty in the position of the focused electron beam, leading to artifacts and placement errors. Finally, photons provide numerous contrast mechanisms such as fluorescence that are not accessible with electrons. In general, it is highly desirable to image with photons. The Achilles heel of photons is resolution.

SUMMARY OF THE INVENTION

According to one aspect of the invention, there is provided a method of producing a high resolution composite image. The method includes producing at least one first diffraction-limited image of a sample using at least one first point-spread function. Moreover, the method includes producing at least one second diffraction-limited image of the sample using at least one second point-spread function. Furthermore, the method includes subtracting the at least one first diffraction-limited image and the at least one second diffracted-limited image to produce the high resolution composite image.

According to another aspect of the invention, there is provided an imaging system. The imaging system includes a point spread function (PSF) module producing a diffraction-limited image of a sample. A convolution module performs convolution of the diffraction-limited image with a first image of a focal spot having a first wavelength to produce a first simulated image. The convolution also performs convolution of the diffraction-limited image with a second image of a focal ring having a second wavelength to produce a second simulated image. A difference module subtracts the first simulated image and the second simulated image to produce the high resolution composite image.

According to another aspect of the invention, there is provided a method of forming an imaging system. The method includes providing a point spread function (PSF) module that produces a diffraction-limited image of a sample. Also, the method includes forming providing a convolution module that performs convolution of the diffraction-limited image with a first image of a focal spot having a first wavelength to produce a first simulated image, the convolution also performs convolution of the diffraction-limited image with a second image of a focal ring having a second wavelength to produce a second simulated image.

BRIEF DESCRIPTION OF THE DRAWINGS

FIG. 7A illustrates an original image using a focal spot; FIG. 7B illustrates a differential image in the presence of Gaussian noise of zero mean and a standard deviation of 10%.

DETAILED DESCRIPTION OF THE INVENTION

The invention includes a novel imaging technique that overcomes the conventional imaging technique by combining images obtained with different focal spots. This invention lies within the broader field of composite imaging. In particular, the invention uses a technique that is called Nodal-Differential Imaging (NDI), where an image obtained with a bright focal spot is subtracted from that obtained with a focal ring. The differential image, so formed can resolve features far below the diffraction limit.

Figure 1:
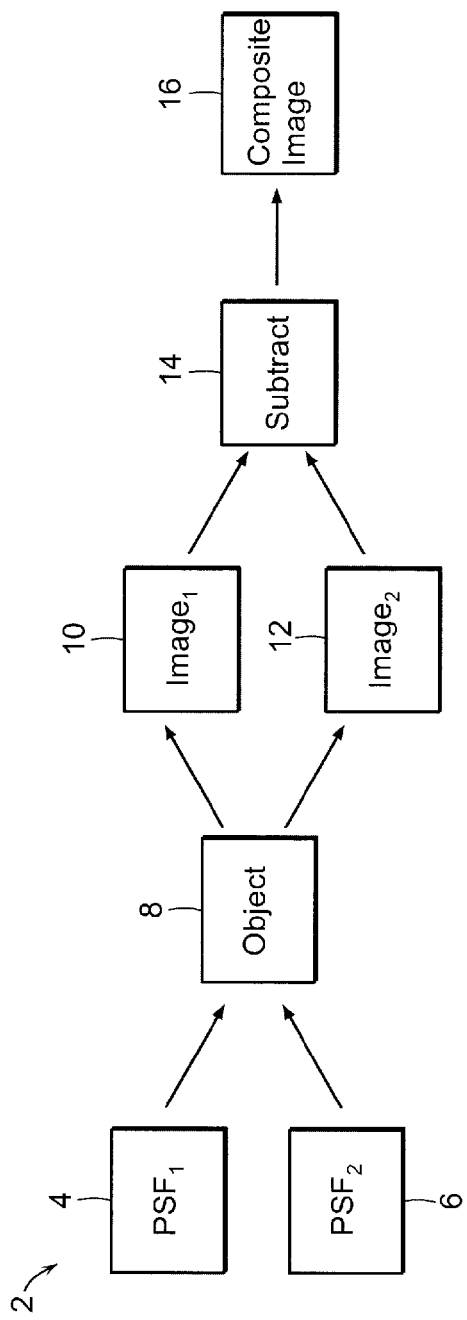
FIG. 1 is a schematic diagram illustrating the components of an imaging system used in accordance with the invention.

FIG. 1 is a schematic diagram of the components of an imaging system 2 used in accordance with the invention. The imaging system 2 includes a first PSF module 4 that probes an object 8 to produce a first diffraction-limited image 10. The diffraction-limited image 10 can be simulated by a discrete convolution of the object 8 with a focal spot having a wavelength, $\lambda_1$. A second PSF module 6 probes the same object 8 to produce second diffracted image 12. The diffraction-limited image 12 can be simulated by a discrete convolution of the object 8 with a focal ring having a wavelength, $\lambda_2$. The focal spot and focal ring are produced using a dichromat lens structure that is described in U.S. patent application Ser. No. 12/253,512 filed by applicant on even date herewith, which is incorporated herein by reference in its entirety. The focal spot and focal ring used to form the two diffracted images 10, 12 can have different wavelengths $\lambda_1$ and $\lambda_2$. Moreover, the focal spot and focal ring can be of the same wavelength but differentiated by polarization.

A subtraction module 14 receives both simulated images 10, 12 and performs subtraction between the images 10, 12, which produces a composite image 16. The composite image 16 can resolve features far below the diffraction limit, and the contrast of the sub-wavelength dense features is increased significantly.

Moreover, the invention can be parallelized with a large array of dichromat lenses. In this case, the signals from the all the dichromat lenses, producing a multitude of various point-spread functions associated with the various focal rings and focal spots, are collected separately and simultaneously. A larger array of aligned focal spots and rings can perform massively parallel, high-speed, high-resolution imaging.

Figure 2:
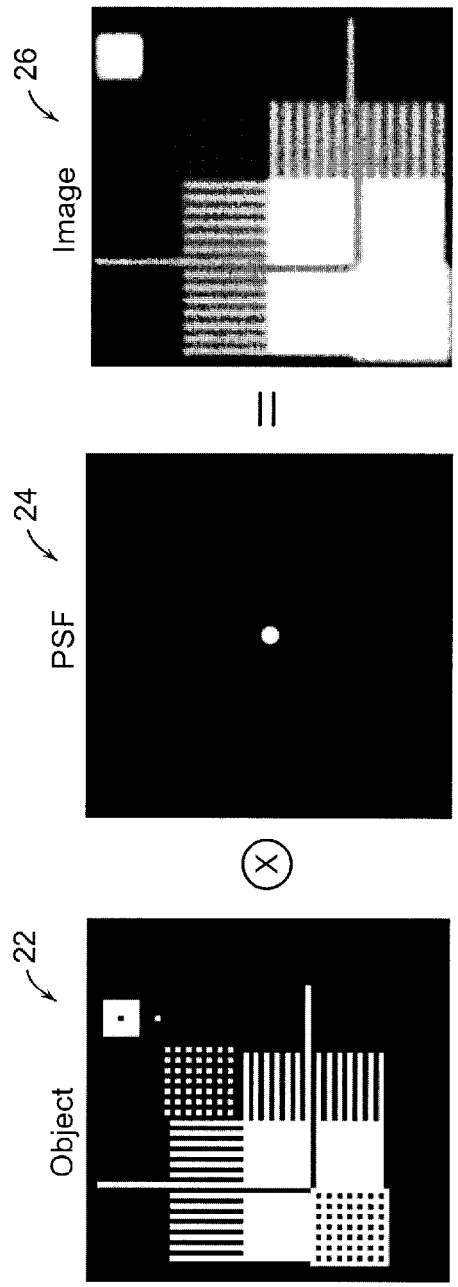
FIG. 2 is a schematic diagram illustrating the image formation process with a conventional scanning optical microscope using a focal spot.

FIG. 2 shows the image formation process with a conventional scanning optical microscope using a focal spot 24. A point-spread function (PSF) module probes the sample 22 to produce a diffraction-limited image 26. The image 26 can be simulated by a discrete convolution of the object 22 with the focal spot 26.

Figure 3:
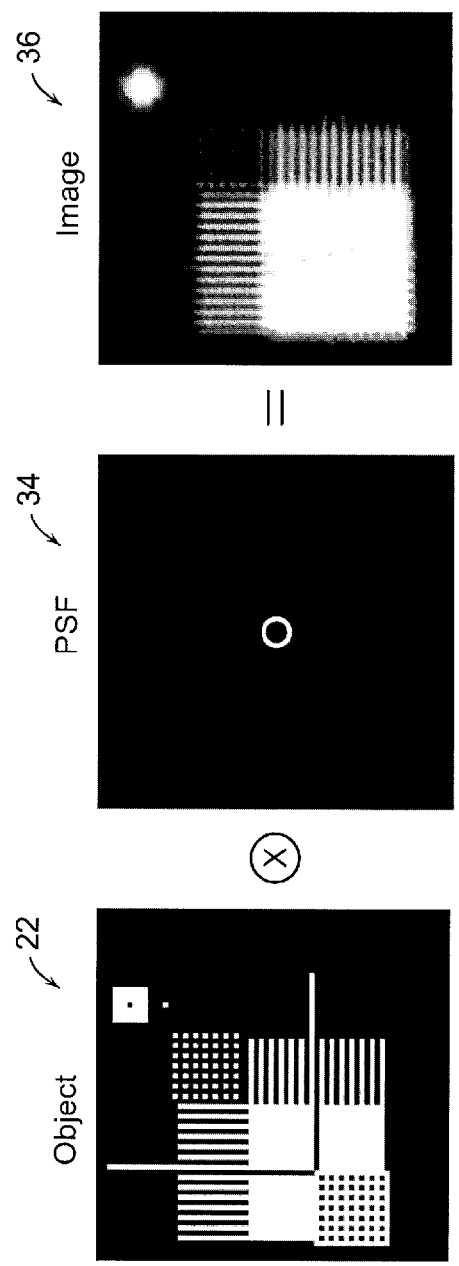
FIG. 3 is a schematic diagram illustrating the image formation process with a conventional scanning optical microscope using a focal ring.

FIG. 3 shows the same object 22 now imaged with a focal ring 34. A point-spread function (PSF) module probes the sample to produce a diffraction-limited image 36. The image 36 is produced by discrete convolution of the object 22 with the focal ring 34.

Figure 4:
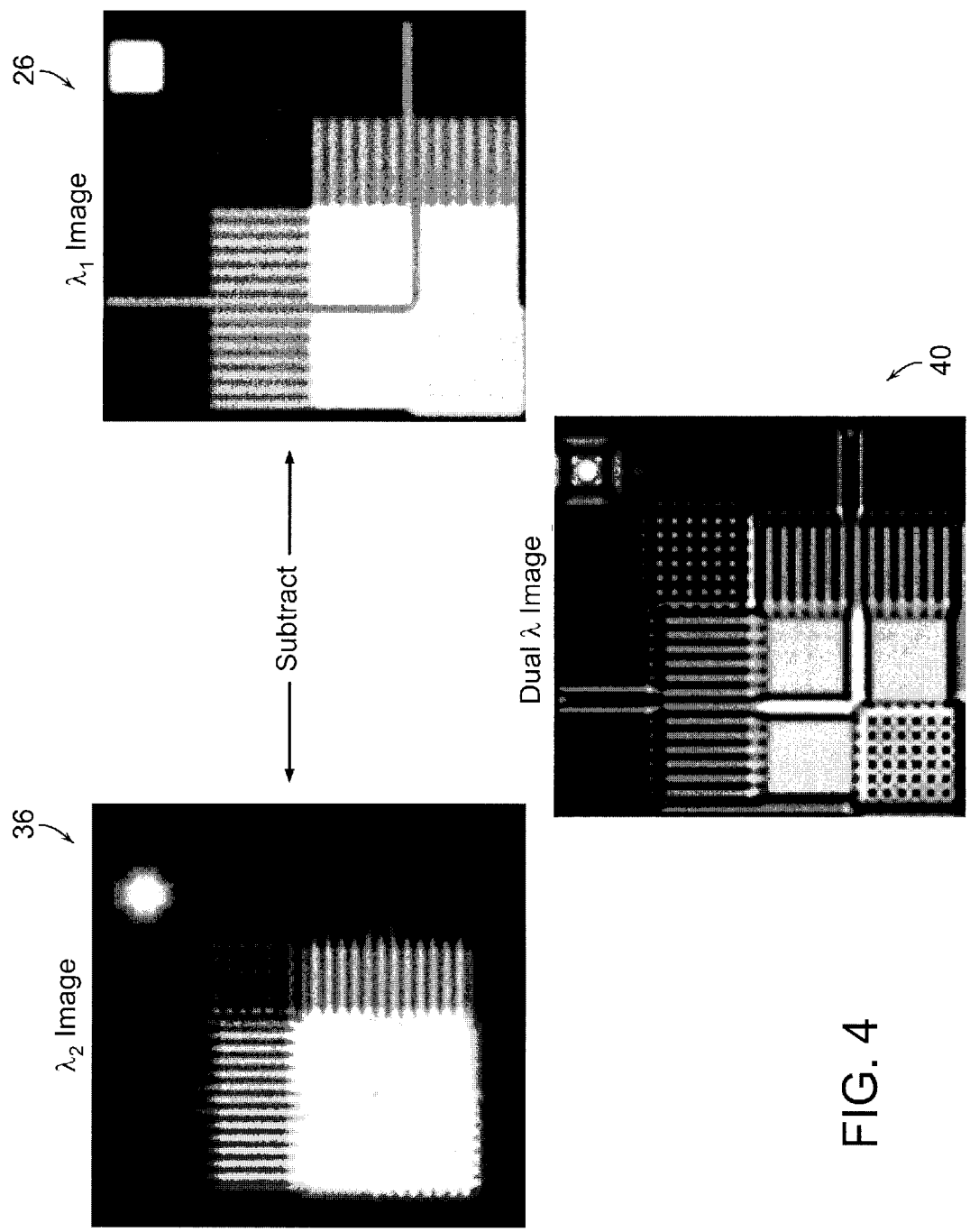
FIG. 4 is a schematic diagram illustrating a composite image formed in accordance with the invention.

FIG. 4 shows the composite image 40 formed by difference module 12 using the difference between the images 36, 26 of FIGS. 2 and 3. Note that the contrast of the sub-wavelength dense features is increased significantly. As a result, the resolution of the optical system that includes of two different focal spots is increased.

Figures 5A, 5B:
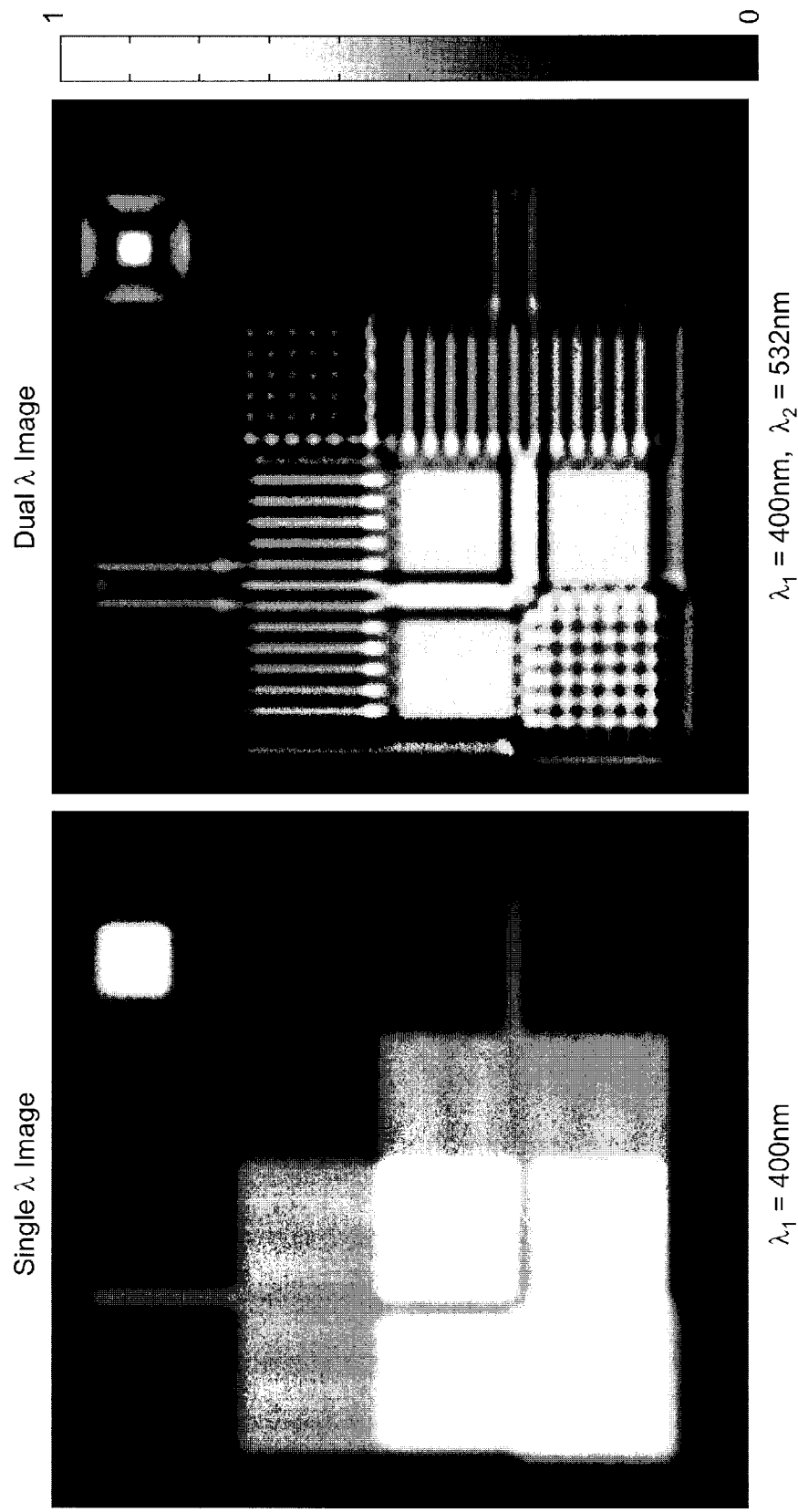
FIG. 5A illustrates an image obtained with a bright focal.
FIG. 5B illustrates a differential image where the smallest features are 50 nm.

In order to quantify the resolution improvement, here one can show several images with decreasing feature sizes. In this particular embodiment, the bright focal spot is generated at one wavelength ($\lambda_1$) and the focal ring at another wavelength ($\lambda_2$). FIG. 5A shows an image obtained with a bright focal spot. FIG. 5B shows the differential image where the smallest features are $\lambda_1/8$ where $\lambda_1=400$ nm and $\lambda_2=532$ nm. Note that even the dense features show excellent contrast, and artifacts are indeed present in the differential image.

Figures 6A, 6B:
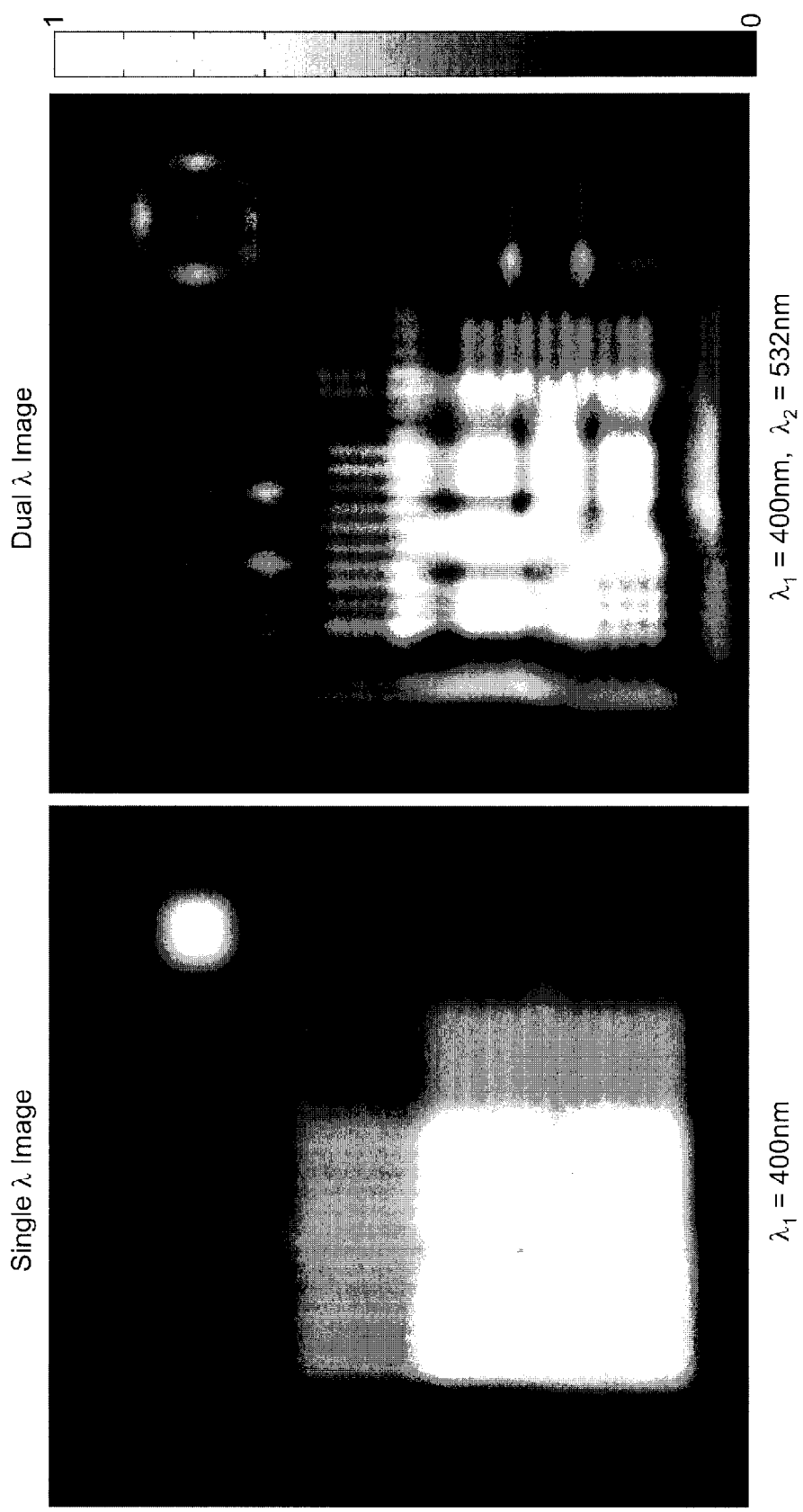
FIG. 6A illustrates an image obtained with a bright focal.
FIG. 6B illustrates the differential image where the smallest features are 25 nm.

FIG. 6A shows an image obtained with a bright focal. FIG. 6B shows the differential image where the smallest features are $\lambda_1/16$ where $\lambda_1=400$ nm and $\lambda_2=532$ nm. As illustrated in FIGS. 6A-6B, features as small as $\lambda_1/16$ have sufficient image contrast for appropriate processing. In many situations such as semiconductor inspection, it is only necessary to detect the presence of variations or defects. This technique can detect with very high sensitivity. One of the important criterions for a robust imaging system is its performance in the presence of noise.

FIG. 7A shows the original image using a focal spot ($\lambda_1=400$ nm) and FIG. 7B shows the differential image (where $\lambda_1=400$ nm and $\lambda_2$ 532 nm) in the presence of Gaussian noise of zero mean and a standard deviation of 10% of the peak signal. It is clear the differential image still provides good contrast.

The focal ring can be generated via a dichromat lens, as discussed above, or using phase elements. The two images can be formed at two different wavelengths $\lambda_1=400$ nm and $\lambda_2=532$ nm. However, one can use other modalities such as polarization, time, etc. to separate the two images. The only constraint is that one of the images be formed with a focal ring, and that the two PSFs should be concentric in space.

Figure 8:
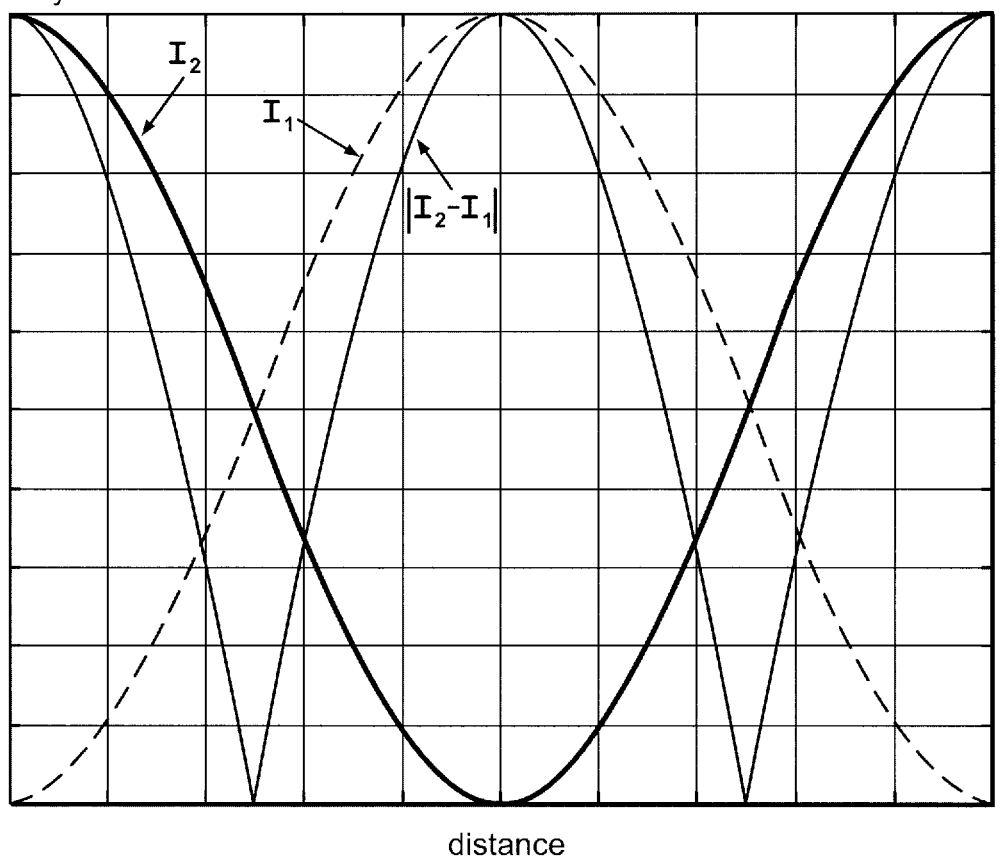
FIG. 8 is a graph illustrating the reasons for the high resolution produced by the invention.

The reason for high resolution is schematically illustrated in FIG. 8. When the focal ring is subtracted from the focal spot, the main lobe of the resulting PSF is smaller than the original one. The large sidelobes give rise to artifacts.

Although the present invention has been shown and described with respect to several preferred embodiments thereof, various changes, omissions and additions to the form and detail thereof, may be made therein, without departing from the spirit and scope of the invention.

What is claimed is:

1. A method of producing a high resolution composite image using an imaging system, comprising:
    producing at least one first diffraction-limited image of a sample using at least one first point-spread function;
    producing at least one second diffraction-limited image of said sample using at least one second point-spread function; and
    subtracting said at least one first diffraction-limited image and said at least one second diffraction-limited image to produce said high resolution composite image having a third point-spread function, said subtraction produces a first lobe and a plurality of sidelobes of said third point-spread function, said sidelobes comprise a plurality of artifacts, said at least one first point-spread function comprises at least one focal spot and said at least one second point-spread function comprises at least one focal ring where the at least one second point-spread function is independently created from the at least one first point-spread function.

2. The method of claim 1, wherein said at least one first diffraction-limited image and said at least one second diffraction-limited image comprise sub-wavelength dense features.

3. The method of claim 1, wherein said high resolution composite image resolve features below a diffraction limit.

4. The method of claim 1, wherein said at least one focal spot and at least one focal ring are concentric in space.

5. The method of claim 1, wherein said at least one focal spot and at least one focal ring each are formed using a dichromat lens.

6. The method of claim 1, wherein said at least one focal spot and at least one focal ring each are formed using an array of dichromat lens.

7. An imaging system comprising:
    a first point spread function (PSF) module producing at least one first diffraction-limited image of a sample using at least one first point-spread function;
    a second point spread (PSF) module producing at least one second diffraction-limited image of said sample using at least one second point-spread function; and
    a difference module subtracting said at least one first diffraction-limited image and said at least one second diffraction-limited image to produce a high resolution composite image having a third point-spread function, said subtraction produces a first lobe and a plurality of sidelobes of said third point-spread function, said sidelobes comprise a plurality of artifacts, said at least one first point-spread function comprises at least one focal spot and said at least one second point-spread function comprises at least one focal ring where the at least one second point-spread function is independently created from the at least one first point-spread function.

8. The imaging system of claim 7, wherein said at least one first diffraction-limited image and said at least one second diffraction-limited image comprise sub-wavelength dense features.

9. The imaging system of claim 7, wherein said high resolution composite image resolve features below a diffraction limit.

10. The imaging system of claim 7, wherein said at least one focal spot and at least one focal ring are concentric in space.

11. The imaging system of claim 7, wherein said at least one focal spot and at least one focal ring each are formed using a dichromat lens.

12. The imaging system of claim 7, wherein said at least one focal spot and at least one focal ring each are formed using an array of dichromat lens.

13. The method of forming an imaging system comprising:
    providing a first point spread function (PSF) module producing at least one first diffraction-limited image of a sample using at least one first point-spread function;
    providing a second point spread (PSF) module producing at least one second diffraction-limited image of said sample using at least one second point-spread function; and
    providing a difference module subtracting said at least one first diffraction-limited image and said at least one second diffraction-limited image to produce said high resolution composite image having a third point-spread function, said subtraction produces a first lobe and a plurality of sidelobes of said third point-spread function, said sidelobes comprise a plurality of artifacts, said at least one first point-spread function comprises at least one focal spot and said at least one second point-spread function comprises at least one focal ring where the at least one second point-spread function is independently created from the at least one first point-spread function.

14. The method of claim 13, wherein said at least one first diffraction-limited image and said at least one second diffraction-limited image comprise sub-wavelength dense features.

15. The method of claim 13, wherein said high resolution composite image resolve features below a diffraction limit.

16. The method of claim 13, wherein said at least one focal spot and at least one focal ring are concentric in space.

17. The method of claim 13, wherein said at least one focal spot and at least one focal ring each are formed using a dichromat lens.

18. The method of claim 13, wherein said at least one focal spot and at least one focal ring each are formed using an array of dichromat lens.

* * * * *